Aug. 4, 1959 J. W. BOZEMAN 2,898,576

CHARACTER RECOGNITION APPARATUS

Filed Dec. 4, 1953 6 Sheets-Sheet 1

INVENTOR.
JOHN W. BOZEMAN
BY Charles P. Boberg
ATTORNEY

Aug. 4, 1959 J. W. BOZEMAN 2,898,576

CHARACTER RECOGNITION APPARATUS

Filed Dec. 4, 1953 6 Sheets-Sheet 2

INVENTOR.
JOHN W. BOZEMAN
BY Charles P. Boberg
ATTORNEY

Aug. 4, 1959 J. W. BOZEMAN 2,898,576

CHARACTER RECOGNITION APPARATUS

Filed Dec. 4, 1953 6 Sheets-Sheet 3

INVENTOR.
JOHN W. BOZEMAN

BY Charles P. Boberg

ATTORNEY

INVENTOR.
JOHN W. BOZEMAN
BY Charles P. Boberg
ATTORNEY

INVENTOR.
JOHN W. BOZEMAN
BY Charles P. Boberg
ATTORNEY

Aug. 4, 1959 J. W. BOZEMAN 2,898,576

CHARACTER RECOGNITION APPARATUS

Filed Dec. 4, 1953 6 Sheets-Sheet 6

INVENTOR.
JOHN W. BOZEMAN
BY Charles P. Boberg
ATTORNEY 2,898,576

CHARACTER RECOGNITION APPARATUS

John W. Bozeman, Baldwin, N.Y., assignor to Burroughs Corporation, Detroit, Mich., a corporation of Michigan Application December 4, 1953, Serial No. 396,247
7 Claims. (Cl. 340—149)

This invention relates to character recognition apparatus and particularly to improvements therein for enabling characters to be identified accurately even though the characters are not accurately positioned with reference to the reading means of the apparatus.

Inaccurate positioning of the characters may result from unavoidable tolerances which are likely to occur in printing the characters, or in cutting the documents on which the characters are printed to a desired size, or in presenting such documents to the reading means. While these inaccuracies might appear negligible to the eye, they tend to have a very substantial effect upon the accuracy with which the recognition apparatus identifies each character.

Various methods for dealing with this problem have been proposed. According to one such proposal, a single scan or "pass" is made across each character to detect a series of aligned index marks within the body of the character, said index marks being positioned in conformity with a code to identify the particular character. The arrangement is such that as the scanning means starts to traverse the character and encounters the first index mark located on the boundary thereof, a distributor commences to operate. Thereafter, the sensing of the respective index marks occurs in a definite timed relationship with the operation of this distributor, and this relationship is unaffected by the fact that the character is displaced from the nominal position which it should occupy. The arrangement just described has a serious disadvantage in that it requires a special or unconventional formation of the characters to accommodate the single-line code markings within the body of each character. Hence, it cannot be employed as a general-purpose character recognition device.

It is a principal object of this invention to provide an improved character recognition apparatus of universal application which does not require that the characters be formed in any unconventional fashion nor that they be located accurately with respect to their nominal positions.

Another object is to provide novel means for enabling a character to be identified accurately by its overall configuration or appearance, rather than by predetermined index marks or code symbols associated therewith, and also to facilitate the accurate identification of characters printed from conventional type fonts, such identification being unaffected by misplacement of the character.

A further object is to provide a character recognition apparatus of economical manufacture which is inherently accurate in its operation.

In the description of the invention which follows, various references will be made to the "starting edge" and "starting point" of a character which is being scanned. The "starting edge" of the character may be defined as the locus of every point on the boundary of the character which the scanning means first encounters as it executes each of its scans, and the "starting point" is the first one of these points to be detected.

One of the features of the invention is the utilization of one or more cathode ray tubes each having sweep circuits that are so synchronized with the scanning of the character that each vertical sweep of the cathode ray tube starts substantially at the instant when the scanning spot encounters the starting edge of the character in the corresponding vertical scan, and each horizontal sweep of the cathode ray tube starts concurrently with the beginning of the first vertical sweep (that is, with the detection of the starting point). This causes the cathode ray tube to project upon its screen a transformed image of the character wherein the edge of said image that corresponds to the starting edge of the original character is brought into coincidence with a fixed reference line on said screen, and the point on said image corresponding to the starting point of the original character is located at one extremity of said reference line.

Irrespective of the position occupied by the original character (so long as the character is contained entirely within a given field or scanning area), the transformed image of said character will occupy a predetermined fixed position on the screen of the cathode ray tube. Hence, inaccuracies in the positioning of the character will have no detrimental effect upon the accuracy with which this transformed image is located on the screen of the cathode ray tube, inasmuch as the image is stabilized against both horizontal and vertical displacements of the character from the position which nominally it should occupy. This feature greatly facilitates the identification of each character, as will be apparent from the description of the invention that follows.

(The terms "horizontal" and "vertical" are employed in a relative sense only and should not be construed literally for all conditions under which the invention may be used.)

Other objects of the invention will be pointed out in the following description and claims and illustrated in the accompanying drawings, which disclose, by way of example, the principle of the invention and the best mode, which has been contemplated, of applying that principle.

Figs. 6A to 6H, 6J to 6N, and 6P are diagrams representing certain numerical and alphabetical characters in their original and transformed configurations.

Figure 1:
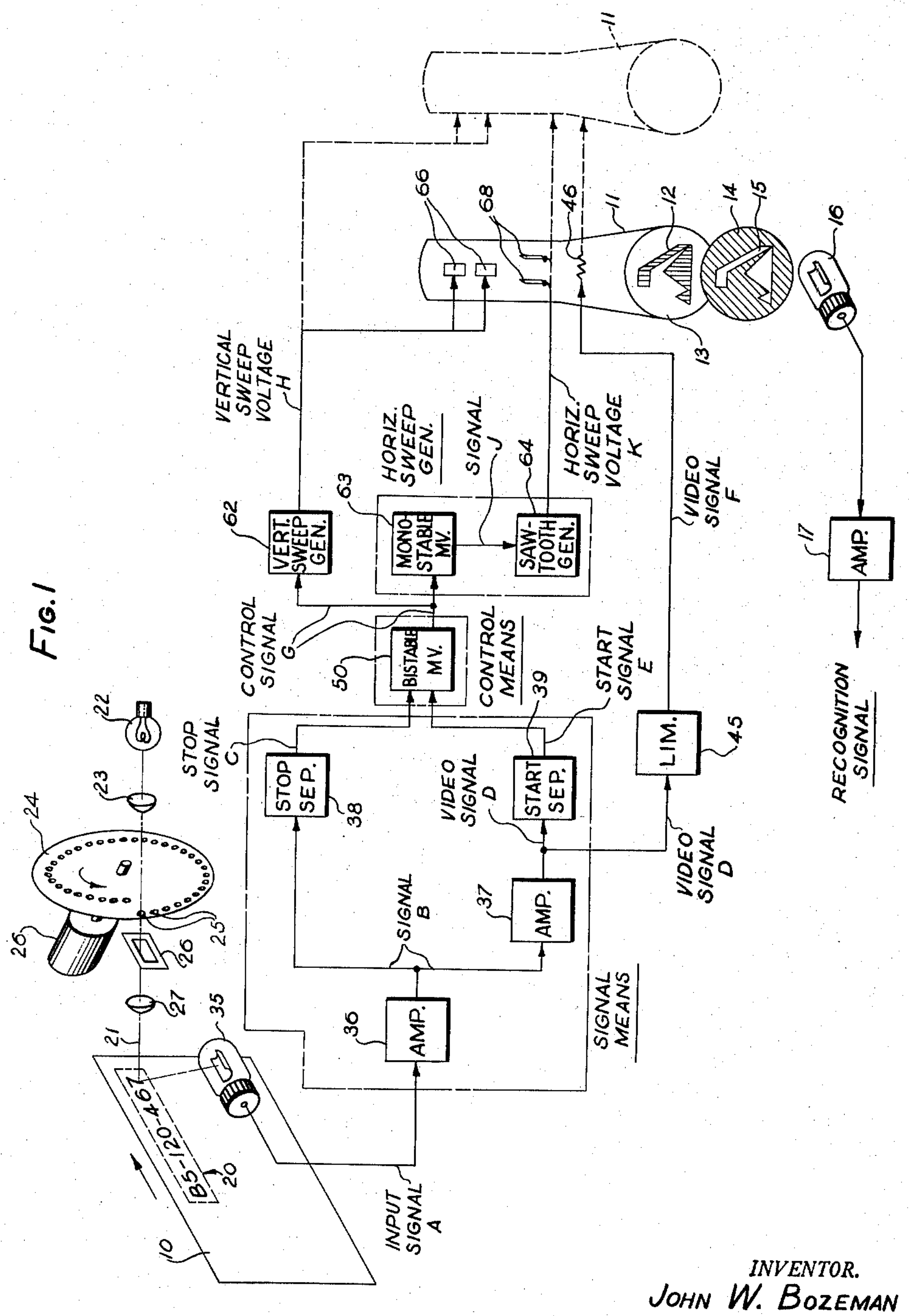
Fig. 1 is a general schematic representation of a character recognition apparatus which embodies the principle of the invention.
Figure 7:
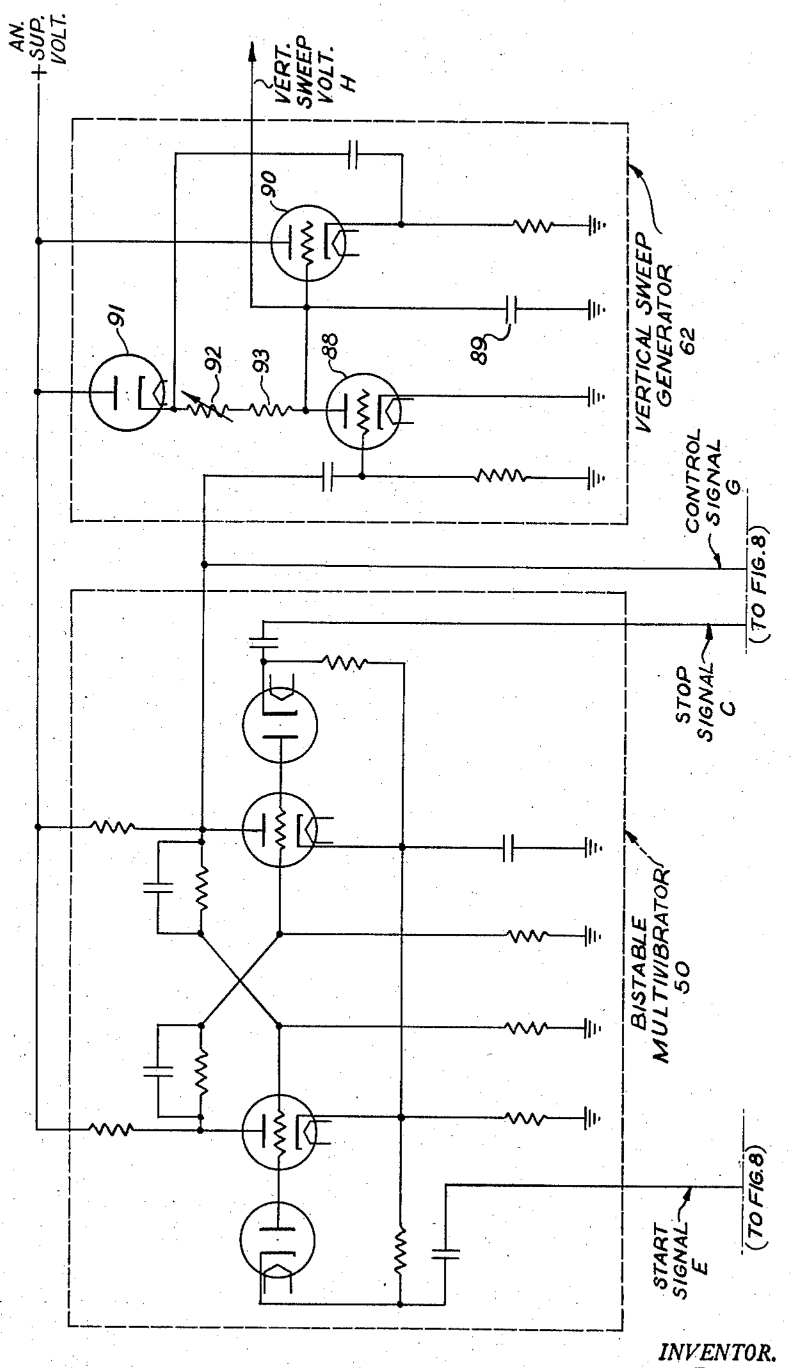
Figure 8:
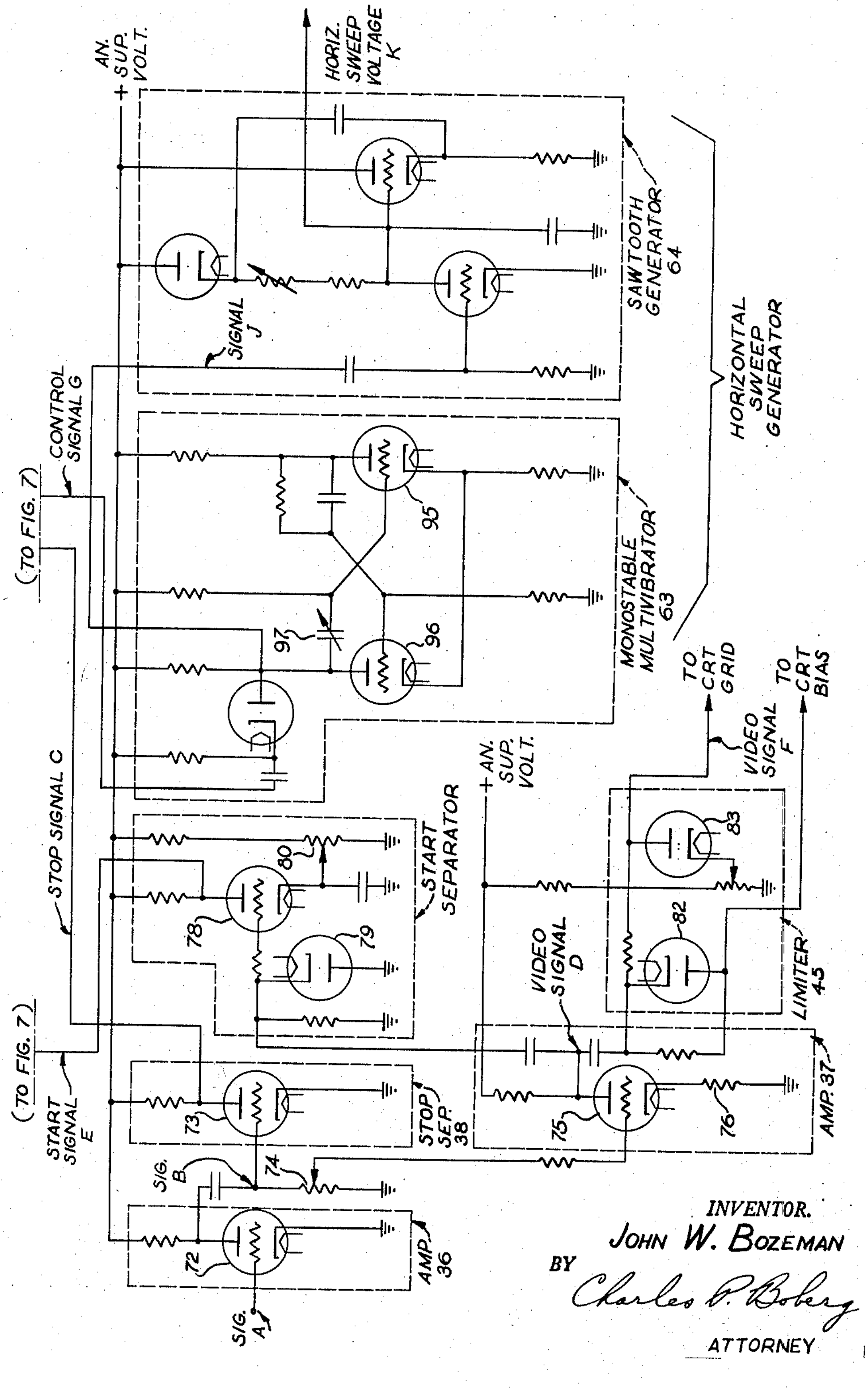

Figs. 7 and 8, when joined, constitute a circuit diagram of the apparatus shown in Fig. 1.

For the purpose of describing the invention, it will be assumed that the character recognition apparatus, Fig. 1, is employed for the purpose of reading serial numbers on documents 10 which are presented in sequence thereto. These documents may be travelers' checks, for example. The apparatus scans the individual characters of each serial number in sequence, and as each character is scanned, a transformed image 12 (Fig. 1) of said character is displayed by a group of cathode ray tubes 11. In front of the screen 13 of each cathode ray tube 11 there is disposed a mask or stencil 14 having a cutout portion 15 adapted to match the transformed image of a particular character. Stencils of different characters are associated respectively with the various cathode ray tubes. Depending upon whether or not there is a match between the transformed character image 12 and the cutout portion 15 of a particular stencil 14, a photocell 16 or other light-sensitive element is activated to furnish (through the amplifier 17) a recognition signal which indicates whether or not the character has been identified.

Essentially, the invention comprises a combination of various circuits (shown in the lettered blocks, Fig. 1) for insuring that the transformed image 12 of a scanned character shall be stabilized against any inaccuracies which might occur in the positioning of the character relative to the reading or scanning means of the apparatus. Due to unavoidable tolerances which must be permitted in printing the characters on the document 10 and in cutting each document to the desired size, or as the result of other causes that cannot be controlled with great precision, the actual position of a character may be displaced from the desired nominal position thereof. Despite such inaccuracies of positioning, however, the present apparatus functions to display an image of the character (such as the image 12, Fig. 1) which is positioned with extreme accuracy on the screen of a cathode ray tube. The circuits for accomplishing this function will be described herein, following a preliminary description of the scanning means and its operation.

Figure 2:
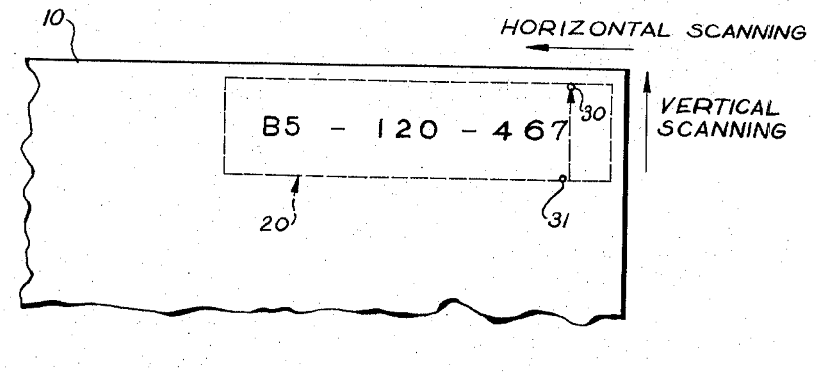
Fig. 2 is a fragmentary elevational view of a document showing a serial number thereon which is to be scanned for recognition purposes.

The serial number on the document 10, which may comprise both alphabetical and numerical characters as indicated, is contained within an area 20, Figs. 1 and 2, designated herein as the "scanning area." It is essential that the entire serial number be contained within this scanning area, which is sufficiently large to accommodate all characters of the number (despite inaccurate positioning thereof) within the range of tolerances permitted. The location of the scanning area 20 is determined primarily by the functioning of the scanning means and has only an approximate relationship to the boundaries of the document 10. While each individual character may be displaced vertically and/or horizontally from its nominal position due to the inaccuracies mentioned above, the character will be identified accurately so long as it lies entirely within the scanning area 20.

Referring to Fig. 1, the document 10 is fed (by means not shown) into a position where the scanning area 20 thereon may be traversed by a rapidly moving light beam 21. The illumination originates at the light source 22, from which it is directed by a lens 23 toward the scanning disc 24. The scanning disc 24 has a series of spirally arranged holes 25 in it, and as the disc 24 is rotated by the motor 26, these holes 25 move successively past the lens 23 and the light source 22. As each hole 25 passes in front of the lens 23, a beam or pencil of light is projected through this hole and through a window 26 in front of the disc 25 to the lens 27, where the light is concentrated into a scanning beam 21. The transverse dimension of the scanning area 20 is determined by the transverse width of the opening in the window 26. The downward movement of each hole 25 between the lens 23 and the window 26 produces a corresponding upward movement of the scanning spot which is projected upon the document 10 by the light beam 21, due to the inversion effected by the lens 27.

Preferably the feeding means is so arranged that the document 10 moves intermittently, and each time the document comes to rest a portion of the scanning area 20, wide enough to contain a whole character, is scanned vertically a number of times. The vertical scanning takes place progressively due to the spiral arrangement of the holes 25. Thus, referring to Fig. 2, as the scanning spot 30 projected by a light beam 21 through one of the holes 25 (Fig. 1) completes its vertical scanning movement in an upward direction across the area 20, the scanning spot 31 projected through the next succeeding hole 25 in the disc 24 starts its vertical scanning movement from the lower boundary of the area 20. The line traced by each scanning spot actually is a small arc having a radius proportional to that of the scanning disc 24. Inasmuch as the radius of curvature is very large, however, it will be assumed herein that the vertical scan lines are linear rather than curved.

The number of holes 25 in the scanning disc 24 is selected to provide the necessary resolution or fineness of scanning. Due to the graduations in the radii of the holes 25, a certain amount of horizontal scanning movement takes place during each revolution of the disc 24. That is to say, the vertical scan lines traced by the various scanning spots such as 30 and 31, Fig. 2, are separated from each other during one revolution of the disc 24, causing the field within which a character is disposed to be scanned successively along parallel lines. This operation may be repeated several times for each character, if the document 10 is assumed to remain stationary for a sufficient length of time. When each character has been scanned the desired number of times, the document 10 then may be stepped over to bring the next character into view.

The invention is not limited, of course, to the particular form of scanning or feeding means described thus far. Other types of scanners may be utilized to permit continuous feeding movement of the document. This may involve a different method of analyzing the character display on the cathode ray tube 11, since the image will not appear as intense if each character is scanned only once horizontally. The particular form of scanning means employed, and the means for identifying the character which is displayed, are not essential features of the present invention except to the extent indicated in the appended claims. Equivalent devices may be utilized without departing from the spirit of the invention.

Referring again to Fig. 1, a photocell 35 is arranged to receive the illumination reflected by the document 10. It will be assumed that the photocell is connected with its load in the anode circuit. Therefore, when two scanning spots such as 30 and 31, Fig. 2, are simultaneously present within the scanning area 20, maximum light is reflected from the document 10, and the voltage generated by the photocell 35 is a minimum. The period of overlap in which two scanning spots are simultaneously present is very brief, and normally only the illumination from one scanning spot reaches the photocell 35. Assuming that the characters are printed in black against a white background, the voltage generated by the photocell 35 has its maximum or "black-level" intensity when the scanning spot is within the body of the character. When the photocell 35 is being illuminated by the light from only one scanning spot in the white field, the generated voltage has a "white-level" intensity which is intermediate the minimum and maximum values just mentioned.

Figure 3:
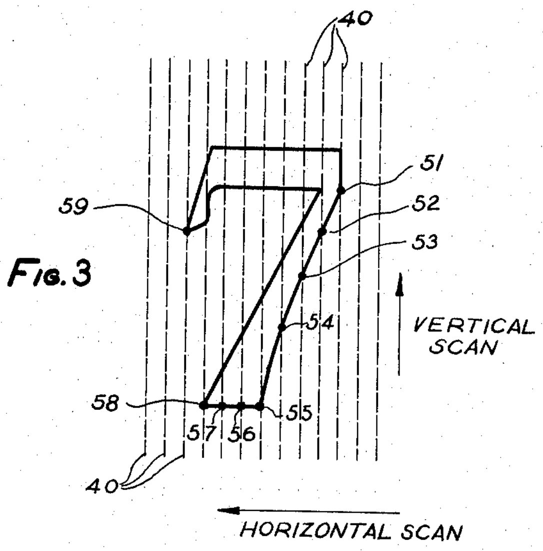
Fig. 3 is an enlarged detail view of a character, showing the manner in which it is scanned by the apparatus.
Figure 5:
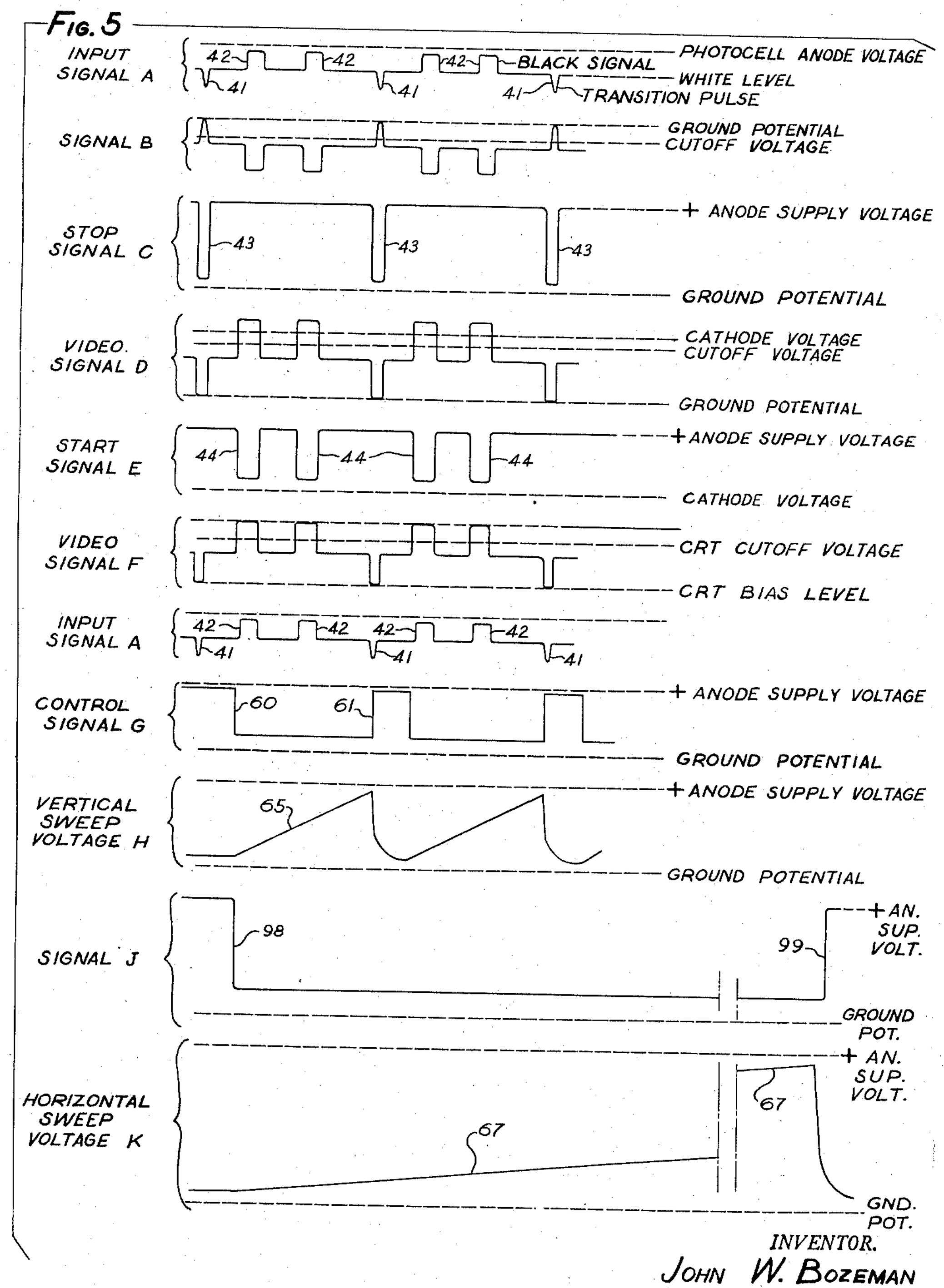
Fig. 5 is a composite graphical representation of various signals and sweep voltages all drawn with reference to a common time base.
Figure 6A:
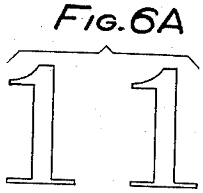
Figure 6B:
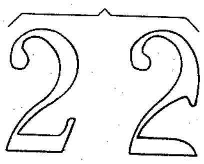
Figure 6C:
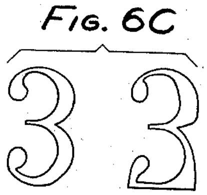
Figure 6D:
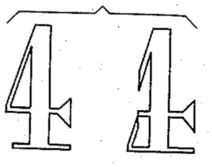
Figure 6E:
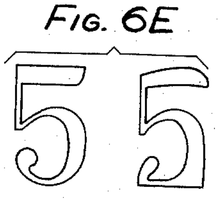
Figure 6F:
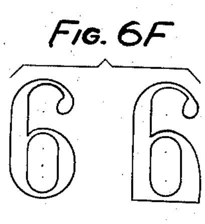
Figure 6G:
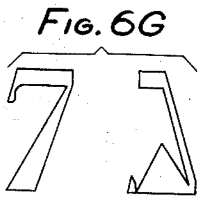
Figure 6H:
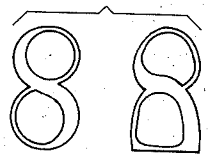
Figure 6J:
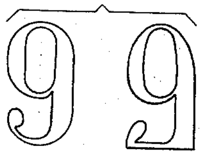
Figure 6K:
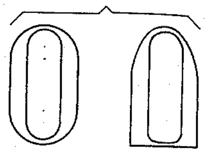
Figure 6L:
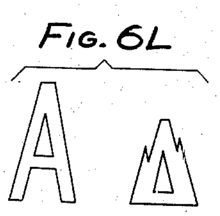
Figure 6M:
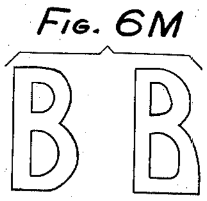
Figure 6N:
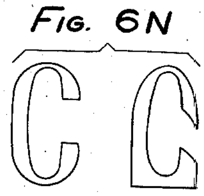
Figure 6P:
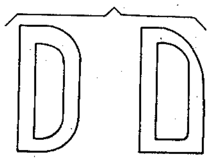

The voltage generated by the photocell 35 is furnished as an "input signal A," Figs. 1 and 5, to a signal means comprising the inverter amplifiers 36 and 37, a "stop" separator 38 and a "start" separator 39. The intensity of signal A varies with the intelligence picked up by photocell 35 in terms of the illumination from the scanning spot, as described above. Fig. 3 illustrates the paths or lines 40 traced by the scanning spots or spot (usually referred to in the singular) for a relatively coarse scan. The vertical scan lines 40 may be spaced more closely together for a fine scan. The optimum spacing is a matter to be determined by practical experience. It should be mentioned here that Fig. 3 shows only the outline or boundary of a character, the digit "7" in this instance. Actually the body of this character could be solid black, against a white background, but for purposes of illustration the solid black interior is omitted in Fig. 3.

The operations of the various components of the signal means, Fig. 1, in response to the input signal A will be described with reference to Fig. 5. In using the term "signal" herein, no attempt is made to give it a strict meaning. It may refer, for example, to a continuous wave having a particular form, or to discrete pulses in a wave, or collectively to a number of individual "signals" in either sense of the word. The interpretation to be given the term "signal" in each instance will be apparent from the context in which it is used.

As shown in Fig. 5, the input signal A is a composite signal comprising a normal white-level signal interspersed with transition pulses 41 and black signal pulses 42. Each transition pulse 41 occurs when the voltage generated by the photocell 35 is reduced to a minimum, due to the simultaneous presence of two scanning spots (such as 30 and 31, Fig. 2) within the scanning area 20. This occurs as each vertical scan terminates and the succeeding vertical scan commences. The black signal pulses 42 are generated whenever a scanning spot traverses the black body of the character. The number and duration of the black signal pulses will be determined, of course, by the configuration of the character; hence the number and spacing of the black signal pulses 42 shown in Fig. 5 are illustrative only.

The input signal A generated by the photocell 35, Fig. 1, is, in effect, a composite video signal wherein the transition pulses 41, Fig. 5, are utilized as synchronization pulses in a manner which will be described presently. The input signal A is amplified and inverted by the amplifier 36, Fig. 1, to furnish the inverted video signal B. Figs. 1 and 5. Without going into the details of the circuitry (which will be described fully hereinafter), stop separator 38 responds to the inverted signal B in such fashion as to furnish a stop signal C comprising stop pulses 43, each corresponding to one of the transition pulses 41 in the input signal A. These stop pulses 43, as will be apparent from the subsequent description, periodically terminate the vertical sweep of the cathode ray tube 11.

The inverted video signal B (or a predetermined fraction thereof) also is fed to the amplifier 37, which again inverts this signal to furnish an amplified video signal D, Fig. 5. Signal D is applied to the start separator 39, which in response thereto furnishes the start signal E. Signal E comprises start pulses 44, each corresponding to one of the black signal pulses 42 in the input signal A. As will be explained presently, the first start pulse 44 in each vertical scan period (i.e., in each interval between two transition pulses 41) is effective to initiate a vertical sweep of a cathode ray tube 11.

The video signal B also is fed to a limiter 45, Fig. 1, which in response thereto furnishes a limited video signal F to the grid 46 of each cathode ray tube 11. Each grid 46 will control the intensity of the electron beam within its cathode ray tube in response to the video signal F.

The graph of the input signal A, top of Fig. 5, is duplicated at the middle of the sheet for convenience in making reference thereto. It has been mentioned above that a start pulse 44 (signal E) is generated in response to each black signal pulse 42, and a stop pulse 43 (signal C) is generated in response to each transition pulse 41. These two sets of pulses are applied to a control means in the form of a bistable multivibrator or flip-flop 50, Fig. 1. The first start pulse 44 in any given vertical scan period causes the multivibrator 50 to switch from an initial stable state to a second stable state. Any further start pulses 44 within this scanning period will have no effect upon the condition of the multivibrator 50. Referring to Fig. 3, the first start pulse in each vertical scan period will occur when the upwardly-moving scanning spot encounters the starting edge of the character, as defined by points such as 51, 52, 53, and so forth to 59. Each time one of these points on the starting edge of the character is detected by the scanning spot, the multivibrator 50, Fig. 1, is switched from its first stable state to its second stable state. The multivibrator 50 then is switched back from its second stable state to its first stable state at the end of each scanning period in response to a stop pulse 43, Fig. 5, in the stop signal C. Since the points such as 51, 52 and 53, Fig. 3, on the starting edge of the character may be detected at different phases of the corresponding vertical scan periods, the time intervals during which the multivibrator 50 is in its second stable state will not necessarily be uniform. However, the multivibrator 50 always will revert to its first stable state at the termination of each vertical scan.

The output of the multivibrator 50, Fig. 1, consists of a control signal G, Fig. 5, having a rectangular waveform. The amplitude of signal G drops to its lower limit (as indicated at 60, Fig. 5) in response to the first black signal pulse 42 in each vertical scan period, and rises to its upper limit (as indicated at 61) in response to each transition pulse 41. Of course, if the multivibrator 50 already has been left in its first stable state from a preceding vertical scan wherein no black signal was generated, the occurrence of a transition pulse 41 will have no effect upon the multivibrator 50. A vertical scan period, as mentioned above, is the interval between two successive transition pulses 41.

The control signal G generated by the multivibrator 50 is employed to control the operations of a vertical sweep generator 62 and a horizontal sweep generator, the latter consisting of a monostable multivibrator 63 and a sawtooth voltage generator 64 controlled thereby. The vertical sweep generator 62 is a sawtooth voltage generator that develops a linear deflecting voltage, as indicated at 65, Fig. 5, during each interval in which the multivibrator 50 is in its second stable state (for instance, between the points 60 and 61 on control signal G, Fig. 5). It will be noted that the vertical deflecting voltage 65 commences to rise when the first black signal pulse 42 in the current vertical scan period is received, and this deflecting voltage 65 attains its peak at the end of said scanning period, when a transition pulse 41 is received. The vertical sweep voltage H, Figs. 1 and 5, comprising the linear sawtooth portions as 65 and the intermediate transient voltages, is applied to the vertical deflecting plates 66, Fig. 1, of each cathode ray tube 11.

The monostable multivibrator 63 in the horizontal sweep generator is controlled by the signal G in such a way that the multivibrator 63 is switched from its initial stable state to a second quasi-stable state in response to the first black signal pulse 42, Fig. 5, in the input signal A. This will occur when the "starting point" of the character (such as the point 51, Fig. 3, for example) is detected by the scaning spot. That is to say, the multivibrator 63 will assume its second or quasi-stable state when the multivibrator 50 is switched from its initial stable state to its second stable state for the first time during the scanning of a given character. The multivibrator 63 has a fixed period during which it remains in its second state, being unaffected by any intervening signals, and at the end of that time it automatically reverts to its initial state. Thus, the signal J, Figs. 1 and 5, produced by the multivibrator 63 descends to its lowermost value (at 98, Fig. 5) as the starting point 51, Fig. 3, is detected, and it remains at said lower value during a time interval which is sufficient to permit the scanning of the entire character. While the signal J is thus held at its lower limit, the sawtooth voltage generator 64 develops the linearly ascending portion 67 of the horizontal sweep voltage K, Fig. 5. This linear portion 67, which is the horizontal deflecting voltage proper, is applied to the horizontal deflecting plates 68 of each cathode ray tube 11.

The combined actions of the vertical sweep voltage H and the horizontal sweep voltage K, Figs. 1 and 5, causes each cathode ray tube 11 to project upon its screen 13 a transformed image (such as the image 12, Figs. 1 and 4) of the original character (Fig. 3). Due to the way in which the vertical sweep voltage H is generated, all those points which lie on the starting edge of the character will appear to be disposed upon a predetermined straight reference line such as 70, Fig. 4, that occupies a fixed position on the screen of each cathode ray tube. Thus, points such as 51, 52, 53 and so on to 59, Fig. 3, on the starting edge of the original character, will have counterparts 51', 52', 53' and 59', Fig. 4, on the image 12 which lie on the reference line 70. This reference line 70 is a straight line of given length, with at least one extremity of this line being fixed in a given position on the screen of each cathode ray tube. The starting point 51, Fig. 3 of the original character (that is, the point on the character which is first detected by a scanning spot), will appear to coincide with the aforesaid extremity of the reference line 70, as indicated at 51', Fig. 4.

Figure 4:
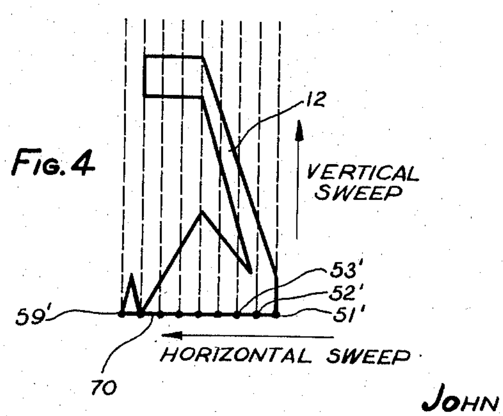
Fig. 4 represents the transformed image of the character shown in Fig. 3, as said image would be displayed on the screen of a cathode ray tube.

By virtue of the transformation which takes place as just described, the image 12, Figs. 1 and 4, may bear very little resemblance to the original character, Fig. 3. Nevertheless, the transformed image will be unique for each particular character and may readily be identified as the image of that character. The fundamental advantage of this arrangement, as already explained, is that the transformed image 12 will occupy an absolutely fixed position on the cathode ray tube screen 13, Fig. 1, being stabilized against any inaccuracies in the positioning of the original character relative to the scanning means of the apparatus. Hence, even though the original character is displaced horizontally or vertically from its nominal or true position, its image will not be affected by any such displacement. This enables a very ready comparison to be made between the image projected on the cathode ray tube screen and a standard character representation (such as the cutout portion 15 of the stencil 14 Fig. 1) occupying a predetermined or fixed position relative to said screen. Thus, it will be seen that the above stated objects of the invention are fulfilled in the disclosed apparatus.

Figs. 6A to 6H, 6J to 6N, and 6P illustrate the manner in which various characters may be transformed when displayed by a cathode ray tube in accordance with the above teachings. In each of these views the original character is written alongside the transformed character representation corresponding thereto. All ten of the decimal digits have been represented, together with four typical alphabetical characters. The apparatus is capable of displaying numerous other characters in addition to those shown, but for simplicity, only a few have been shown. The extent to which each character is altered in appearance will depend, of course, upon the original configuration of the character. In the case of the numeral "1," since the starting edge of the original character already is a straight horizontal line, there will be no change in shape of this character when it is transformed. Where the starting edge has a configuration other than a straight horizontal line, however, the appearance of the image may differ considerably from that of the original character. The change of shape is influenced to a great extent by the style of printing employed, and the form of the comparison stencil (such as 14, Fig. 1) which is employed will be determined by the printing style. Obviously it would be possible to use other types of comparison devices than the one illustrated.

The details of the various circuits represented by lettered blocks, Fig. 1, are shown in Figs. 7 and 8. These circuits will be described now with reference to the general block diagram in Fig. 1 and the graphical representations of the various signals shown in Fig. 5. The input signal A furnished by the photocell 35 is impressed upon the grid of a vacuum tube 72, Fig. 8, in the amplifier 36. An amplified and inverted wave, identified as signal B, appears at the plate of the tube 72. Signal B is applied to the grid of a vacuum tube 73 in the stop separator 38. Grid current conduction in the tube 73 causes the positive excursion of signal B to be clamped at ground potential, as indicated in Fig. 5. The amplitude of the waveform is sufficient to cause clipping thereof at the cutoff voltage of tube 73. The plate output of tube 73 (stop signal C) therefore contains only the amplified and clipped transition pulses 43, Fig. 5. This stop signal C is fed to the bistable multivibrator 50, Fig. 7, for the purpose presently to be described.

Referring again to Fig. 8, a fraction of the signal B voltage is taken off the slider of a potentiometer 74 and is applied to the grid of a vacuum tube 75 in the amplifier 37. Due to the reduction in amplitude effected by the potentiometer 74, and to the degenerative effect of the cathode resistor 76 connected in the cathode circuit of the tube 75, there is no clipping or clamping action within the tube 75, so that signal B is merely inverted and amplified to produce the video signal D.

Signal D is applied to the grid of a vacuum tube 78 after being clamped by a diode 79, whereby the negative excursion of this grid voltage is fixed at ground potential. The tubes 78 and 79 are included in the circuit of the start separator 39. By virtue of the bias developed at the top of the cathode potentiometer 80 associated with the tube 78, both grid conduction clipping and cutoff clipping occur in tube 78. The two voltage limits between which clipping occurs are indicated on the graph of signal D in Fig. 5. The resultant plate voltage waveform of tube 78 is represented by the start signal E in Fig. 5, containing the pulses 44.

(As mentioned above, only the first of the start pulses 44 in each vertical scan period is effective.) This start signal E is fed to the bistable multivibrator 50, Fig. 7, for a purpose which will be explained presently.

The amplified signal from the plate of tube 75, Fig. 8, identified as the video signal D, Fig. 5, is applied to a limiter 45 to produce the video signal F. The limiter 45 has a diode 82 therein which serves to clamp the negative excursion of the video signal F to the grid bias of the cathode ray tube 11, Fig. 1. The potentiometer 74, Fig. 8, in the grid circuit of the tube 75 is so adjusted that only the positive peaks of the video signal F (Fig. 5), corresponding to the black signal pulses 42 of the original input signal A, rise above the cutoff voltage of the cathode ray tube. Hence, the electron beam current in the cathode ray tube flows only during the black signal pulses, so that the cathode ray tube screen is illuminated only in response to the black signal pulses. The upper end of the video signal F is limited by the cathode voltage of a diode 83 in the limiter 45.

Referring now to Fig. 7, a bistable multivibrator or flip-flop 50 of well known design is operated under the control of start signal E and stop signal C to generate the control signal G, Fig. 5. The signals E and C are applied to opposite sides of the multivibrator 50 through differentiating circuits and coupling diodes. The start signal E triggers the multivibrator 50 from its initial stable state to a second stable state at the leading edge of the first black pulse following a transition pulse. This occurs at point 60 on the control signal G, Fig. 5, which coincides in time with the leading edge of the first black signal pulse 42, signal A, following a transition pulse 41. The multivibrator 50 is triggered back to its first stable state in response to the next succeeding transition pulse 41, at point 61 on control signal G, Fig. 5. The operation just described is repeated each time a black signal pulse occurs for the first time within a vertical scan period.

The control signal G generated by the multivibrator 50 is applied to the grid of a tube 88 in the vertical sweep generator 62. During the negative excursion of the control signal G, tube 88 becomes cut off, and the capacitor 89 in its anode circuit begins to charge from a few volts above ground potential. As the charging voltage on the capacitor 89 rises, the cathode voltage of a tube 90 (connected as a cathode follower) follows the rise in the charging voltage. This causes the cathode of a diode 91 to follow the charging voltage also, so that the increments in voltage of the cathode of tube 91 are substantially equal to the increments in voltage at the grid of tube 90. By virtue of this action, the voltage across the resistors 92 and 93 through which the capacitor 89 charges is maintained substantially constant. The charging current which flows through these resistors, therefore, is essentially constant, causing the capacitor 89 to charge at a constant rate, whereby a linear sawtooth voltage is generated as indicated at 65 on the graph of sweep voltage H, Fig. 5. When the cathode voltage of tube 91 exceeds the anode supply voltage, tube 91 ceases to conduct, but the sawtooth voltage continues to rise inasmuch as current is supplied from the cathode of tube 90. Before the charging voltage rises to the anode supply voltage, the waveform of the control signal G swings positive as indicated at 61, Fig. 5, causing the tube 88 to conduct and rapidly discharge the capacitor 89. The resulting waveform of the vertical sweep voltage H is shown in Fig. 5. The circuit of the vertical sweep generator 62, as shown in Fig. 7, is commonly referred to as a "bootstrap" circuit.

The control signal G also is employed to trigger the monostable multivibrator 63, Fig. 7, which is part of the horizontal sweep generator, Fig. 1. The first time the control signal G goes negative (point 60, Fig. 5) in the course of scanning a character, the multivibrator 63 is triggered from its initial stable state to a second, quasi-stable state. As shown in Fig. 8 the control signal G is coupled into the multivibrator circuit 63 through a differentiator and a diode. When the control signal G goes negative as just described, a tube 95 in the multivibrator circuit 63 becomes non-conductive and a tube 96 starts to conduct. This produces the sharp negative-going excursion of signal J, as shown at 98 in Fig. 5. The multivibrator 63 remains in this state until the capacitor 97 has charged to a point where the grid potential of tube 95 rises above the cutoff value, whereupon the tube 95 commences to conduct, and tube 96 ceases to conduct. The interval during which the capacitor 97 is charging is sufficiently long to permit the entire character to be scanned, and during this interval the signal J is maintained at its lower level as indicated in Fig. 5.

The signal J is fed into a horizontal sawtooth generator 64, the construction of which is substantially identical with that of the vertical sweep generator 62, Fig. 7, except that the sawtooth generator 64 develops the linearly ascending portion 67, Fig. 5, of its output voltage K at a much slower rate. The sawtooth portion 67 of the sweep voltage K commences when the signal J drops to its lower level (at 98, Fig. 5) and terminates when the signal J reverts to its higher level (at 99, Fig. 5).

Some of the circuits shown in Figs. 7 and 8 have not been described in minute detail inasmuch as these circuits and their functions are well known to those who are skilled in the art. Thus, for example, the bistable multivibrator or flip-flop 50 is of well known construction, and details thereof consequently have been omitted from the foregoing description. Other circuits have been described only to the extent deemed necessary for an understanding of the present invention.

While there have been shown and described and pointed out the fundamental novel features of the invention as applied to a preferred embodiment thereof, it will be understood that various omissions and substitutions and changes in the form and details of the device illustrated and in its operation may be made by those skilled in the art, without departing from the spirit of the invention. It is the intention, therefore, to be limited only as indicated by the scope of the claims appended hereto.

I claim:

1. Apparatus for recognizing one or more characters recorded upon a medium, said apparatus comprising the combination of scanning means for scanning said medium successively along a plurality of lines thereon in the neighborhood of each character to detect those portions of the respective lines which are occupied by said character, signal means controlled by said scanning means for producing a signal the intensity of which varies according to the information picked up by said scanning means, a cathode ray tube, a vertical sweep generator for said cathode ray tube, a horizontal sweep generator for said cathode ray tube, control means responsive to the signal produced by said signal means for initiating a cycle of said horizontal sweep generator whenever the intensity of said signal exceeds a predetermined value for the first time during the scanning of said character as a whole and for initiating a cycle of said vertical sweep generator whenever the intensity of said signal exceeds said predetermined value for the first time during each individual line scan, said cathode ray tube being operable under the control of said signal means and of said sweep generators to produce a transformed image of said character in which the points on said character that effectively initiated the vertical sweep cycles appear to lie on a predetermined fixed line in the image, with the point that effectively initiated the horizontal sweep cycle occupying one extremity of said fixed line, and character identifying means associated with said cathode ray tube for identifying said character from its transformed image.

2. Apparatus for recognizing one or more characters recorded upon a medium, said apparatus comprising the combination of scanning means for scanning said medium successively along a plurality of lines thereon in the neighborhood of each character, signal means controlled by said scanning means for producing a predetermined signal whenever said scanning means detects a transition from a blank portion of said medium to an adjoining portion of said medium occupied by said character during each individual line scan, a cathode ray tube, a horizontal sweep generator for said cathode ray tube, a vertical sweep generator for said cathode ray tube, control means for said sweep generators responsive to the signals produced by said signal means for initiating a horizontal sweep operation in response to the first of said predetermined signals which occurs during the scanning of said character as a whole and for initiating a vertical sweep operation in response to the first of said predetermined signals which occurs during each individual line scan, said cathode ray tube being operable under the control of said signal means and said sweep generators to produce a transformed image of said character, and character identifying means associated with said cathode ray tube for identifying said character from its transformed image.

3. Apparatus for recognizing one or more characters recorded upon a medium, said apparatus comprising the combination of scanning means for scanning said medium successively along a plurality of lines thereon in the neighborhood of each character, signal means controlled by said scanning means for producing a start signay whenever said scanning means detects a transition from a blank portion of said medium to an adjoining portion of said medium occupied by said character during each individual line scan, said signal means also being effective to produce a stop signal under the control of said scanning means at the end of each individual line scan, a cathode ray tube, a horizontal sweep generator for said cathode ray tube, a vertical sweep generator for said cathode ray tube, control means for said sweep generators responsive to the signals produced by said signal means for initiating a horizontal sweep operation in response to the first of said start signals which occurs during the scanning of said character as a whole and for initiating a vertical sweep operation in response to the first of said start signals which occurs during each individual line scan, said control means also being operable under the control of said signal means to terminate each vertical sweep operation in response to the stop signal at the end of each individual line scan, said cathode ray tube being operable under the control of said signal means and said sweep generators to produce a transformed image of said character, and character identifying means associated with said cathode ray tube for identifying said character from its transformed image.

4. In an apparatus adapted to scan a record medium successively along a plurality of lines in the neighborhood of a character recorded upon said medium and to display an image of the scanned character on a cathode ray tube for identification thereof, the combination of signal means responsive to the scanning of said medium to produce signals respectively representing the transitions from portions of said lines that are not occupied by the character to the adjoining portions of said lines that are occupied by said character, horizontal sweep means for the cathode ray tube, vertical sweep means for the cathode ray tube, and control means for both of said sweep means responsive to the signals produced by said signal means for causing a horizontal sweep cycle to be initiated concurrently with the first transition signal produced during the scanning of said character as a whole and for causing a vertical sweep cycle to be initiated concurrently with the first transition signal produced during each individual line scan.

5. In an apparatus adapted to scan a record medium successively along a plurality of lines in the neighborhood of a character recorded upon said medium, a plurality of cathode ray tubes, signal means responsive to the scanning of said medium to produce signals respectively representing the transitions from portions of said lines that are not occupied by the character to the adjoining portions of said lines that are occupied by said character, horizontal sweep means for each of said cathode ray tubes, vertical sweep means for each of said cathode ray tubes, control means for all of said sweep means responsive to the signals produced by said signal means for causing a vertical sweep cycle to be initiated by each vertical sweep means concurrently with the first transition signal produced during each individual line scan and for causing a horizontal sweep cycle to be initiated by each horizontal sweep means concurrently with the first transition signal produced during the scan of each character, whereby a plurality of identical transformed images of the character are produced by said cathode ray tubes, and image comparison devices respectively associated with said cathode ray tubes for identifying the character which is represented by said images.

6. Apparatus for recognizing one or more characters recorded upon a medium, said apparatus comprising the combination of scanning means for scanning said medium successively along a plurality of lines thereon in the neighborhood of each character, signal means controlled by said scanning means for producing a start signal whenever said scanning means detects a transition from a portion of a line not occupied by the character to an adjoining portion of said line occupied by said character in each individual line scan and for producing a stop signal under the control of said scanning means at the end of said line scan, a cathode ray tube, a horizontal sweep generator for said cathode ray tube, a vertical sweep generator for said cathode ray tube, control means for said sweep generators including a bistable control element which is responsive to the signals produced by said signal means for assuming one of its stable states in response to the first start signal in each line and for assuming the other of its stable states in response to a succeeding stop signal, said control means being effective to produce a vertical sweep operation of said vertical sweep generator during each interval when said control element is in the first one of its stable states and being effective also to initiate a horizontal sweep operation of said horizontal sweep generator when said control element assumes said first stable state for the first time during the scanning of said area, said cathode ray tube being operable under the control of said signal means and said sweep generators to produce an image of said character having its base fixed on a given reference line, and character identifying means associated with said cathode ray tube for identifying said character from its image.

7. The combination defined by claim 1, wherein said character identifying means includes a member having a pattern portion adapted to match the transformed image of a predetermined character, and means for indicating whether the image actually produced by said cathode ray tube matches said pattern portion.

References Cited in the file of this patent

UNITED STATES PATENTS

| | | |
|---|---|---|
| 2,533,242 | Gridley | Dec. 12, 1950 |
| 2,575,909 | Davis et al. | Nov. 20, 1951 |
| 2,736,770 | McNaney | Feb. 28, 1956 |